United States Patent Office 2,991,870
Patented July 11, 1961

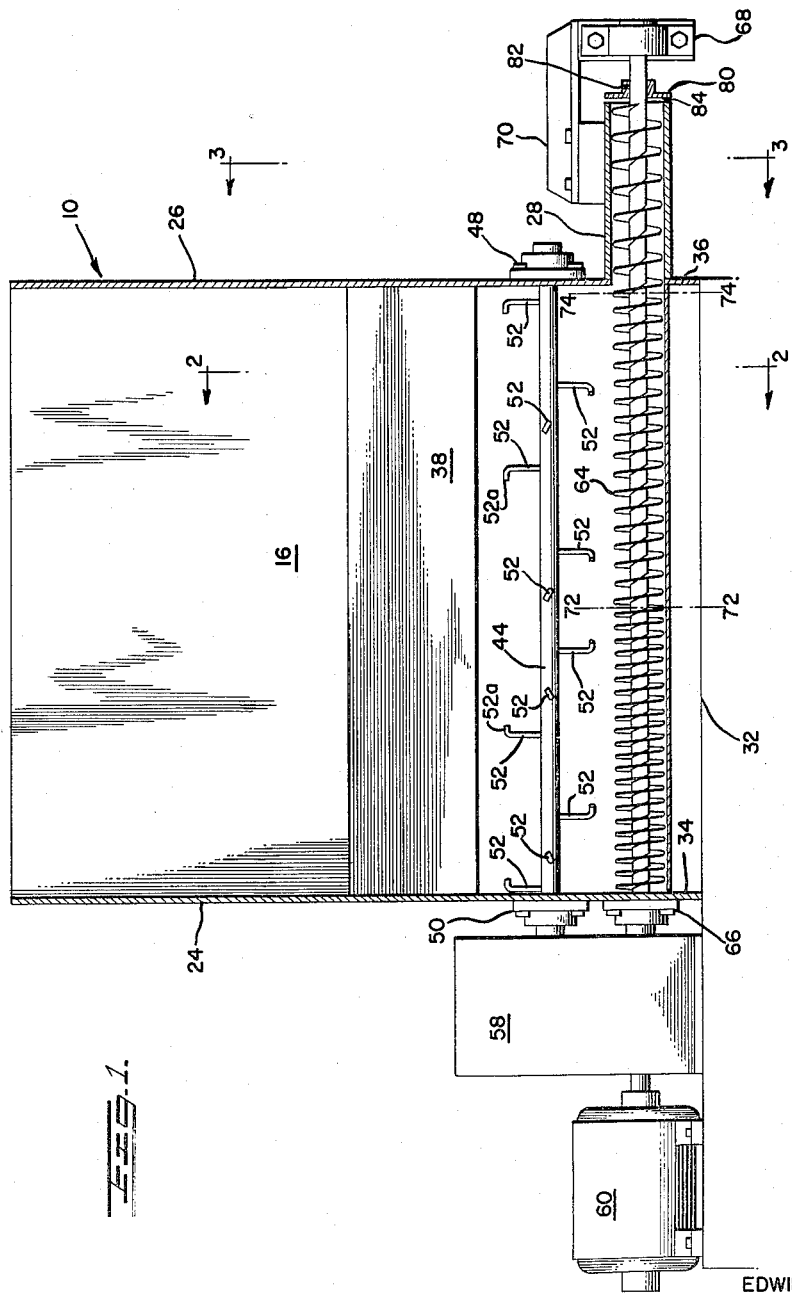

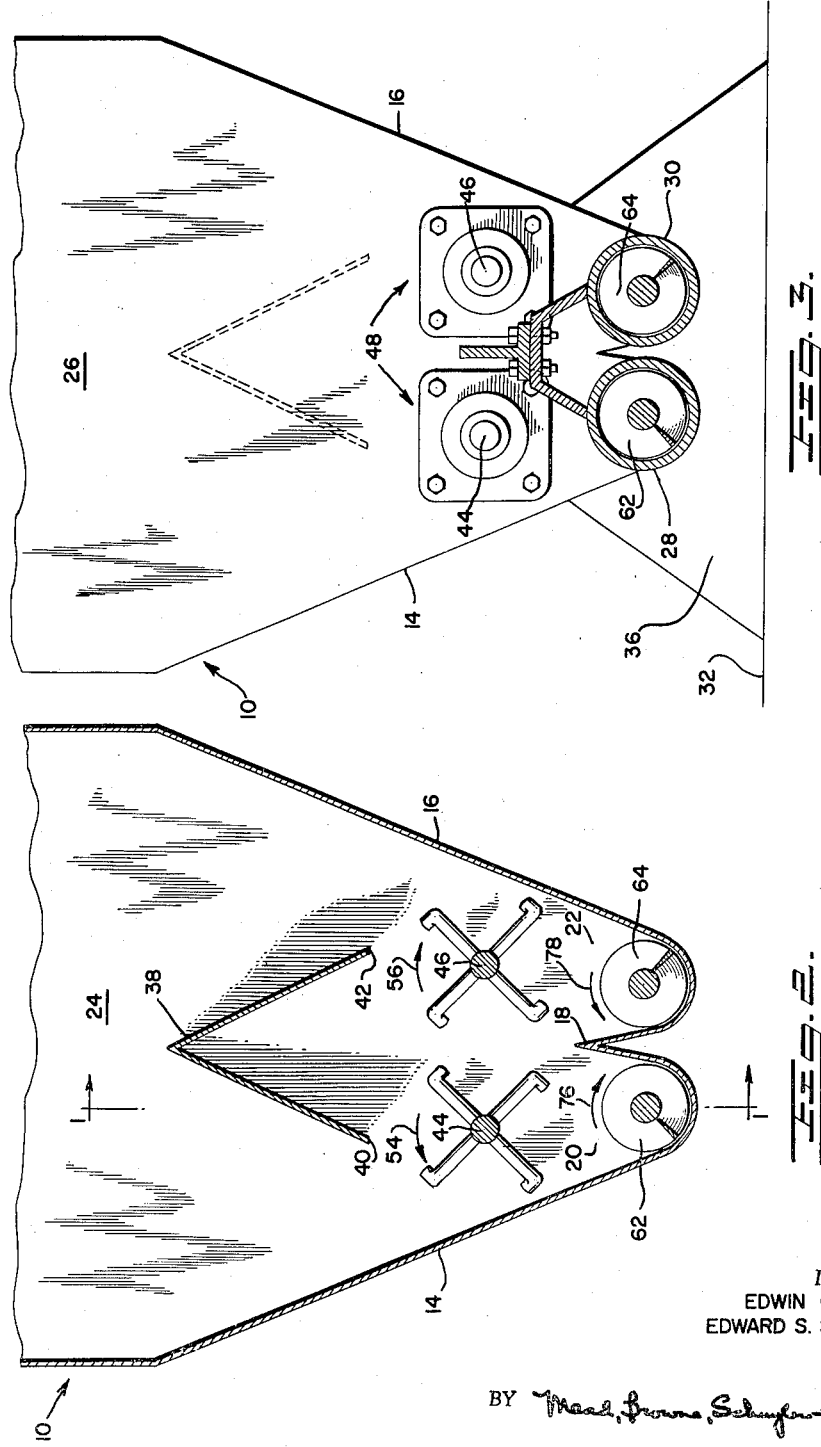

---

2,991,870
MATERIALS PROCESSING APPARATUS
Edwin Griffith, 905 Ave. C, and Edward S. Stickley,
1907 Hart, both of Dodge City, Kans.
Filed Sept. 11, 1956, Ser. No. 609,204
5 Claims. (Cl. 198—64)

This invention relates to apparatus for processing solid materials, and more particularly to apparatus for converting bulk material composed of solid particles into a uniformly dispersed loosely textured mass having a substantially uniform density and for delivering the converted particles at a predetermined constant rate whereby the present invention may be employed in continuous mixing or manufacturing processes.

Generally speaking, prior art devices for the metering and feeding of particulate solid or granular materials function in such a manner as to exert compressive forces which tend to compact said materials during the metering process. As a consequence of said compressive forces, said materials are delivered from these devices as a more or less dense mass. More particularly, in the case of solid materials where the individual particles have surface characteristics such as to cause a high degree of cohesion when compacted or compressed, prior art devices tend to deliver the materials in clumps or balls so that the delivered mass is non-uniform in density.

These characteristics are particularly objectionable in metering processes in which the materials are being delivered into a continuous mixing or manufacturing process wherein uniformity of the final mixture or product is dependent wholly or in part upon addition of solid ingredients or reagents in a dispersed state of uniform density into or upon vessels or conveyors or other apparatus. Further, when such materials are delivered into containers by bulk, variation in density of the delivered material obviously causes variations in weight or amount of material.

These problems are particularly troublesome at extremely low rates of flow wherein severe clumping or cohesion of the material results in gross variations in the density of the metered mass and creates the effect of discontinuous feeding or pulsation.

It is an object of our invention to provide an apparatus which will process solid materials and deliver them as a uniformly dispersed loosely textured mass exhibiting a minimum of cohesion of individual particles into clumps or balls.

It is another object of our invention to provide an apparatus which will deliver such materials at predetermined constant rates of flow exhibiting no pulsations at even the lowest attainable rates.

It is a further object of our invention to provide an apparatus wherein the aforementioned constant rate of flow may be adjusted as desired.

Examples of materials which may be processed by apparatus according to the present invention include granular, fibrous, powdered or amorphous materials having a wide range of properties such as particle size, particle size distribution and bulk density. Of particular interest in the application of our invention are certain farinaceous and mineral solid materials of a wide range of sub-division in which a fibrous or cementitious character of the surfaces of the individual particles may cause cohesion of said particles under extremely small compressive forces or under gravitational forces in bulk. The application of our invention, however, is not limited to materials of these types.

In the achievement of the foregoing and other objects, we provide a hopper having transversely convergent side walls at its lower portion. A baffle member having an inverted V-shaped cross section is centrally located between the converging side wall portions and extends the entire length of the hopper. The outer edges of the baffle are spaced from the side walls to define a gap through which material may pass from above the baffle into an agitating region within the hopper. An agitating assembly extends the length of the hopper below the baffle member and is continuously driven to agitate the material in this region. A screw type conveyer assembly extends along the trough-shaped bottom of the hopper and projects from the interior of the hopper through an open ended discharge tube. The lead of the conveyor increases in the direction toward the discharge opening to prevent increasing the compression upon the material as it is conveyed.

Because of the positioning and construction of the baffle and the agitating means located above the conveyor, the pressure due to the weight of material above the conveyor is maintained substantially constant regardless of the amount of material in the hopper. A major amount of the weight of material within the hopper is supported by the baffle member while the constant agitation of the material between the baffle member and the conveyor assures a constant pressure immediately above the conveying screw.

A dispersion disc is provided at the discharge end of the discharge tube and, in one form of the invention, may take the form of a radial plate mounted upon the shaft of the conveying screw which projects through the discharge opening. Means are provided for adjustably positioning the dispersion disc axially of the shaft thereby controlling the dispersion of material discharged from the discharge tube. Means are also provided for driving both the agitating assembly and the conveyor screw assembly at speeds which may be selected in accordance with the properties of the material being handled and the desired rate of delivery of said material.

Other objects and advantages of our invention will become apparent by reference to the following specification taken in conjunction with the accompanying drawings.

In the drawings:

FIG. 1 is a partial longitudinal sectional view through a materials feeding and metering apparatus embodying our invention taken on line 1—1 of FIG. 2;

FIG. 2 is a vertical cross section of the apparatus taken on line 2—2 of FIG. 1, with the agitating element rotated approximately 45° from its FIG. 1 position; and FIG. 3 is a vertical cross section of the apparatus of FIG. 1 taken on line 3—3 of FIG. 1.

Referring now to the drawings, one exemplary embodiment of our invention includes a hopper 10 having downwardly convergent side walls 14 and 16. The bottom of hopper 10 is formed with an upwardly projecting ridge 18 which extends the entire length of the hopper to define, in cooperation with side walls 14 and 16, two longitudinally extending troughs 20 and 22. Rear end wall 24 completely encloses the rear of hopper 10 while front end wall 26 is formed with a pair of openings at the end of troughs 20 and 22. A pair of discharge tubes 28 and 30 are secured to end wall 26 and form longitudinal continuations of troughs 20 and 22 respectively. Hopper 10 is preferably supported upon a fixed frame or table 32 by any suitable means such as cradles 34—36.

A longitudinally extending baffle member 38, having an inverted V-shaped cross section as shown in FIG. 2, extends the entire length of hopper 10 and is secured at each end to end walls 24 and 26 by any suitable means such as welding. As best seen in FIG. 2, baffle member 38 is symmetrically disposed with respect to the vertical center line of hopper 10 and terminates at lower edges 40 and 42 which are spaced a substantial distance inwardly with respect to their respective adjacent side walls.

An agitating assembly is mounted in the interior of the hopper below baffle member 38 and includes a pair of parallel shafts 44, 46 which extend the entire length of hopper 10. Shafts 44 and 46 project through the end walls of hopper 10 and are rotatably supported with respect to the end walls by bearing assemblies 48, 50. Each of shafts 44 and 46 is provided with a plurality of radially extending agitating fingers 52. The distal ends 52a of fingers 52 are bent in a direction at right angles to the main portion of fingers 52 but which is inclined with respect to the axis of the associated shaft.

As shown in FIG. 1, the distal ends of the fingers 52 on the rear half of shaft 46 are directed forwardly while the distal ends of the fingers 52 on the forward half of shaft 46 are directed rearwardly. The orientation of the distal ends of fingers 52 on shaft 44 is reversed from that of shaft 46. By this construction, the opposite rotation of shafts 44 and 46 as indicated by arrows 54, 56 of FIG. 2 urges material in hopper 10 toward a region midway between end walls 24 and 26.

Shafts 44 and 46 are extended beyond rear bearing assemblies 50 and are coupled through a variable speed gear box, generally designated by reference numeral 58, to a drive motor 60. The coupling in gear box 58 is arranged, in a manner well known to those skilled in the art, to impart rotation to shafts 44 and 46 in the directions indicated by arrows 54 and 56 in FIG. 2 at selected speeds of rotation.

A pair of conveyor screws 62 and 64 are respectively mounted in the troughs 20 and 22 at the bottom of hopper 10. Each of screws 62 and 64 extends the entire length of hopper 10 and continues forwardly of front wall 26 to the end of its associated discharge tube. The respective rear ends of screws 62 and 64 are supported by bearing assemblies 66 on rear wall 24 and the screws are coupled through gear box 58 to drive motor 60. The forward end of the conveyor screws includes an extension on each of the shafts which is supported in a double bearing assembly 68 which, in turn, may be supported from the hopper by a frame 70 fixedly secured to the discharge tubes.

As best seen in FIG. 1, it will be noted that the lead of the screw increases toward its forward end. In the illustrated embodiment the increase in lead is accomplished by steps, the lead being constant from the rear end of the screw to line 72—72 where it is increased to a greater lead which is constant between line 72—72 and 74—74. Forwardly of line 74—74, the flights of the conveyor screw pass through the discharge tube and the lead of the flights in this region is again enlarged. By increasing the lead toward the discharge end of the conveyor, the material does not tend to be compressed as greatly as if the lead were held constant. The metering function of the device is accomplished in the region of the screws between the two end walls by the laying down of the material at uniform density into the screw troughs so that the screws can move it forward in a uniform stream. If the screws had uniform lead throughout this region, fresh material would in effect enter the screws only at the rearward end of the apparatus, and the region of effective metering would be confined to that rearward end. On the other hand, if the lead increases toward the front end of the apparatus, material will also enter the screws in the forward part of the apparatus, and the effective metering region will thereby be extended to include most of the region between the end walls. This results in more accurate metering and less tendency toward compacting of the material; and it also maintains uniform level of the material in the hopper. We have found that the single increase in lead at or near the location designated at 72 in FIG. 1 is sufficient to accomplish satisfactory operation in these several respects. It will be understood that the two factors of first laying the material down into the trough at uniform density and, secondly, avoiding subsequent packing are essential to accurate metering, since a screw device operates on volumetric principles and can therefore deliver at a constant gravimetric rate only under conditions of constant density.

Gear box 58 couples the screws 62 and 64 to drive motor 60 in a manner such that the screws rotate in the respective directions indicated by arrows 76 and 78 in FIG. 2. The relative orientation of the directions of rotation of the conveyor screws and their associated agitating shafts is such that material entering the flights of the conveyors does so most conveniently at a region closely adjacent ridge 18. This region is shielded from the static pressure of the material in the hopper by baffle member 38 and the action of both agitating members is to reduce the pressure along the region where the material enters the conveying screw.

To control the region of discharge, we have associated with each conveyor screw a plate-like member 80 which may be described as a dispersion disc. Each disc is mounted upon the extension of the shaft of the conveying screw with which it is associated and is locked to the shaft for rotation therewith as by a set screw 82. Set screw 82 permits dispersion disc 80 to be adjusted axially with respect to the discharge opening of the associated discharge tube. Gap 84 may therefore be varied to enable the discharge of material from hopper 10 to be dispersed and controlled as desired. Furthermore, the dispersion discs rotate correspondingly to the rotation of the conveyor screws (see arrows 76 and 78 shown in FIG. 2) to urge the discharged material to comingle and fall in a common continuous stream from the outlet ends of discharge tubes 28 and 30. It will of course be understood that gear box 58 may be constructed to permit the speed of rotation of conveying screws 62 and 64 to be varied as desired.

While we have described but a single embodiment of our invention, it will be apparent to those skilled in the art that the described embodiment is capable of modification. Therefore, the foregoing description is to be considered exemplary rather than limiting and the true scope of our invention is that defined in the following claims.

What we claim as our invention is:

1. Materials processing apparatus comprising a hopper having spaced end walls, downwardly convergent side walls and a trough shaped bottom, one of said end walls having a discharge opening at the lower end thereof, a conveying screw assembly extending the length of said bottom and projecting through said discharge opening, an agitating assembly rotatably supported between said end walls above said conveying screw assembly, means for concurrently driving said conveying screw assembly and said agitating assembly, a baffle member supported between said end walls above said agitating assembly and partially overlying said agitating assembly, and material dispersion means adjustably mounted with respect to the discharge end of said conveying screw assembly, said material dispersion means having a planar surface facing the discharge end of said conveying screw assembly and defining, with said discharge end, a discharge gap which may be varied in width by adjusting the mounting of said material dispersion means.

2. Materials processing apparatus comprising a hopper having spaced end walls, downwardly convergent side walls and a trough shaped bottom, one of said end walls having a discharge opening at the lower end thereof, a conveying screw assembly extending the length of said bottom and projecting through said discharge opening, the lead of said conveying screw assembly increasing in a direction toward said discharge opening, an agitating assembly rotatably supported between said end walls above said conveying screw assembly, means for concurrently driving said conveying screw assembly and said agitating assembly, a baffle member supported between said end walls above said agitating assembly and partially overlying said agitating assembly, and a material dispersion disc adjustably mounted in spaced relationship with respect to the discharge end of said conveying screw assembly and defining, together with said discharge end, a discharge gap which may be varied in width.

3. Materials processing apparatus comprising a hopper having spaced end walls, downwardly convergent side walls and a bottom defining a pair of side by side troughs extending between said end walls, a pair of open ended discharge tubes projecting outwardly from one of said end walls and defining continuations of said troughs, a conveying screw assembly comprising a left and a right handed conveying screw respectively located in said troughs and extending the length of said hopper and through said discharge tubes, means for rotating said conveying screws in opposed directions to urge material within said hopper along said trough and to discharge material through said discharge tubes, a pair of agitating elements rotatably supported in and extending between said end walls, said agitating elements being respectively located above said conveying screws, means coupling said agitating elements to the means driving said conveying screws to drive each of said agitating elements in a direction opposite to the direction of rotation of the conveying screw located immediately below said agitating element, a stationary baffle member having an inverted V-shaped transverse cross section extending between said end walls and partially overlying said agitating elements to maintain the static pressure of material immediately above said conveying screw assembly at a substantially constant pressure independent of the amount of material in said hopper, and material dispersion means mounted upon each of said conveying screws for rotation therewith at selected distances from the discharge end of said discharge tubes.

4. Materials processing apparatus comprising a hopper having spaced end walls, downwardly convergent side walls and a bottom defining a pair of side by side troughs extending between said end walls, a pair of open ended discharge tubes projecting outwardly from one of said end walls and defining continuations of said troughs, a conveying screw assembly comprising a left and a right handed conveying screw respectively located in said troughs and extending the length of said hopper and through said discharge tubes, the lead of each of said conveying screws being greater along the portions of said screws within said discharge tube than the portions of said screws within said hopper, means for rotating said conveying screws in opposed directions to urge material within said hopper along said trough and to discharge material through said discharge tubes, a pair of agitating elements rotatably supported in and extending between said end walls, said agitating elements being respectively located above said conveying screws, means coupling said agitating elements to the means driving said conveying screws to drive each of said agitating elements in a direction opposite to the direction of rotation of the conveying screw located immediately below said agitating element, a stationary baffle member having an inverted V shaped transverse cross section extending between said end walls and partially overlying said agitating elements to maintain the static pressure of material immediately above said conveying screw assembly at a substantially constant pressure independent of the amount of material in said hopper, and material dispersion means mounted upon each of said conveying screws for rotation therewith at selected distances from the discharge end of said discharge tubes.

5. Materials processing apparatus comprising a hopper having spaced end walls, downwardly convergent side walls and a trough-shaped bottom, one of said end walls having a discharge opening adjacent its bottom, a conveying screw assembly extending the length of said trough-shaped bottom and projecting through said discharge opening, means for driving said conveying screw assembly to urge material in said hopper along the bottom thereof toward and through said discharge opening, the lead of the flights of said conveying screw assembly adjacent said discharge opening and within said hopper being greater than the lead of the flights of said conveying screw assembly adjacent the opposite hopper end wall, means in said hopper overlying said conveying screw assembly to maintain the static pressure of material immediately above said conveying screw assembly at a substantially constant pressure independent of the amount of material in said hopper, a materials dispersion disc, and means for mounting said dispersion disc on said conveying screw assembly for rotation therewith at selected locations spaced from said discharge opening to control the dispersion of material discharged therefrom.

References Cited in the file of this patent

UNITED STATES PATENTS

| Number | Name | Date |
|---|---|---|
| 772,941 | Kefauver | Oct. 25, 1904 |
| 1,703,465 | Woodhead | Feb. 26, 1929 |
| 1,721,553 | Haines | July 23, 1929 |
| 2,104,617 | Fischer | Sept. 17, 1935 |
| 2,184,248 | Bonotto | Dec. 19, 1939 |
| 2,321,838 | McBean | June 15, 1943 |
| 2,569,039 | Berthelot | Sept. 25, 1951 |
| 2,636,284 | Napier | Apr. 28, 1953 |
| 2,692,702 | Church | Oct. 26, 1954 |
| 2,770,376 | Zinn | Nov. 13, 1956 |